(12) United States Patent
Eldar et al.

(10) Patent No.: US 7,636,403 B2
(45) Date of Patent: Dec. 22, 2009

(54) CORRELATION SHAPING MULTI-SIGNATURE RECEIVER

(75) Inventors: Yonina C. Eldar, Cambridge, MA (US); Alan V. Oppenheim, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 3 days.

(21) Appl. No.: 09/888,762

(22) Filed: Jun. 25, 2001

(65) Prior Publication Data

US 2002/0141481 A1    Oct. 3, 2002

Related U.S. Application Data (60) Provisional application No. 60/269,941, filed on Feb. 20, 2001.

(51) Int. Cl.
    *H04L 27/06* (2006.01)
(52) U.S. Cl. .................................................... 375/343
(58) Field of Classification Search ................. 375/343, 375/316, 340, 346
    See application file for complete search history.

(56) References Cited

U.S. PATENT DOCUMENTS

| 3,668,702 | A |   | 6/1972  | Jones            |        |
|-----------|---|---|---------|------------------|--------|
| 3,879,664 | A |   | 4/1975  | Monsen           |        |
| 3,908,088 | A |   | 9/1975  | Gutleber         |        |
| 4,044,241 | A |   | 8/1977  | Hatley           |        |
| 4,779,266 | A |   | 10/1988 | Chung et al.     | 370/93 |
| 4,806,939 | A |   | 2/1989  | Ward et al.      | 342/378|
| 4,944,036 | A |   | 7/1990  | Hyatt            |        |
| 5,210,770 | A |   | 5/1993  | Rice             |        |
| 5,285,480 | A |   | 2/1994  | Chennakeshu et al.|       |
| 5,303,258 | A |   | 4/1994  | Nakamura         |        |
| 5,343,496 | A | * | 8/1994  | Honig et al.     | 370/342|
| 5,381,154 | A |   | 1/1995  | Guerci           |        |
| 5,506,861 | A |   | 4/1996  | Bottomley        |        |
| 5,513,215 | A | * | 4/1996  | Marchetto et al. | 375/233|
| 5,761,237 | A |   | 6/1998  | Petersen et al.  | 375/200|
| 5,784,415 | A |   | 7/1998  | Chevillat et al. |        |
| 5,790,537 | A |   | 8/1998  | Yoon et al.      |        |
| 5,790,588 | A | * | 8/1998  | Fukawa et al.    | 375/148|
| 5,850,414 | A |   | 12/1998 | Miyajima         |        |

(Continued)

FOREIGN PATENT DOCUMENTS

EP        1 022 862 A2    7/2000

OTHER PUBLICATIONS

A Reduced Complexity Algorithm for Combined Equalization and Decoding for Channels with Multipath, ISI or Partial Response, by Raphaeli, et al, IEEE, p. 83-87, 1995.

(Continued)

*Primary Examiner*—Kevin M Burd
(74) *Attorney, Agent, or Firm*—Choate, Hall & Stewart LLP (57) ABSTRACT

A receiver for and method of processing received signals comprising a linear combination of a plurality of signature signals having undergone some distortion. The receiver is comprised of a bank of correlators for receiving the signals, and a correlation shaper operating on a vector output from the bank of correlators. The bank of correlators may comprise a matched filter receiver or a decorrelator receiver. Optionally, a bank of detectors may operate on the vector output of the correlation shaper.

10 Claims, 2 Drawing Sheets

U.S. PATENT DOCUMENTS

| | | | |
|---|---|---|---|
| 5,867,478 | A | 2/1999 | Baum et al. |
| 5,887,024 | A | 3/1999 | Qin et al. |
| 5,905,721 | A | 5/1999 | Liu et al. ............... 370/342 |
| 5,912,165 | A | 6/1999 | Cabib et al. |
| 5,956,333 | A | 9/1999 | Zhou |
| 6,011,812 | A * | 1/2000 | Laakso et al. ............ 375/152 |
| 6,014,373 | A | 1/2000 | Schilling et al. .......... 370/342 |
| 6,067,292 | A * | 5/2000 | Huang et al. ............. 370/342 |
| 6,148,023 | A | 11/2000 | Pelin et al. |
| 6,154,443 | A | 11/2000 | Huang et al. ............. 370/210 |
| 6,166,853 | A | 12/2000 | Sapia et al. |
| 6,178,197 | B1 | 1/2001 | Froelich et al. ............ 375/150 |
| 6,202,047 | B1 | 3/2001 | Ephraim et al. |
| 6,317,612 | B1 * | 11/2001 | Farsakh ................. 455/67.11 |
| 6,522,683 | B1 * | 2/2003 | Smee et al. .............. 375/144 |
| 6,671,338 | B1 * | 12/2003 | Gamal et al. ............. 375/346 |
| 6,771,723 | B1 | 8/2004 | Davis et al. |
| 6,801,565 | B1 * | 10/2004 | Bottomley et al. ......... 375/148 |
| 6,882,689 | B2 | 4/2005 | Maggio et al. |
| 7,292,623 | B2 | 11/2007 | Reznik |
| 2002/0122470 | A1 * | 9/2002 | Heikkila ................. 375/147 |
| 2002/0146066 | A1 * | 10/2002 | Eldar et al. .............. 375/152 |

OTHER PUBLICATIONS

Template Matching: Matched Spatial Filters and Beyond, by Brunelli, et al., Pattern Recognition, vol. 30, No. 5, pp. 751-768, 1997.

"International Search Report," PCT/US02/02512, Feb. 10, 2002.

"Non-Final Rejection," U.S. Appl. No. 09/788,890, Apr. 28, 2003.

"Non-Final Rejection," U.S. Appl. No. 09/788,890, Jan. 9, 2004.

"Non-Final Rejection," U.S. Appl. No. 09/788,890, Jan. 10, 2005.

"Final Rejection," U.S. Appl. No. 09/788,890, Aug. 10, 2005.

"Non-Final Rejection," U.S. Appl. No. 09/788,890, Apr. 21, 2006.

"Final Rejection," U.S. Appl. No. 09/788,890, Jan. 3, 2007.

USPTO Non-final Office Action, U.S. Appl. No. 09/788,890, Feb. 13, 2008.

USPTO Non-final Office Action, U.S. Appl. No. 09/788,890, Oct. 23, 2008.

USPTO Non-fnal Office Action, U.S. Appl. No. 09/788,890, Jun. 10, 2009.

* cited by examiner

Figure 1

Figure 2

CORRELATION SHAPING MULTI-SIGNATURE RECEIVER

This invention claims the benefit of U.S. Provisional Application No. 60/269,941 filed Feb. 20, 2001, the contents of which are herein incorporated by reference.

FIELD OF THE INVENTION

The invention relates generally to processing multi-signature signals having undergone some distortion by shaping the correlation of an output vector from a bank of correlators using a correlation shaping transformation. The present invention finds applications in fields such as wireless communications and multi-target detection and sensing systems. Although a description of the invention is provided with reference to Code Division Multiple Access ("CDMA") systems, one skilled in the art will readily appreciate the applicability of the present invention to time division multiple access and frequency division multiple access systems, as well as other multi-signature contexts.

BACKGROUND OF THE INVENTION

Wireless communications around the world are moving toward CDMA and other multi-signature systems in the third generation. The rapid increase in the number of users of mobile telephones, personal communication services, etc., places challenging demands on future wireless services. Viewed as the generic next generation commercial multiplexing scheme, CDMA offers the promises of efficient use of the available bandwidth, inherent resistance to interference and adaptability to variable traffic patterns.

In some CDMA applications where multi-path delays are not negligible, it is normally difficult to maintain the low cross-correlation among subscribers' signature signals since communication channels are subject to frequency-selective fading. Signal reception using conventional matched filters may suffer severe performance degradation due to mutual interference, especially in a near-far situation (e.g., weak CDMA signals can be overwhelmed by strong power signals in the same system). A class of multi-signature receivers for demodulating CDMA signals has been developed that tries to mitigate the effect of multiple signature signal interference and background noise. These include optimal multi-user receivers, minimum mean-squared error ("MMSE") receivers, decorrelators, and matched filter ("MF") receivers. See generally, S. Verdu, *Multiuser Detection*, Cambridge University Press, 1998, which is hereby incorporated by reference.

Both the optimal receiver and the MMSE receiver require knowledge of the channel parameters, namely the noise level and the received amplitudes of the users' signals. In addition, the optimal receiver is nonlinear and requires knowledge of the probability density function of the noise, making it very complicated to implement. As a result, most commercial users do not use optimal receivers, instead relying on sub-optimal receivers. This use of sub-optimal receivers results in inferior performance in multi-user CDMA environments.

MF and decorrelator receivers, on the other hand, require knowledge of only the signature signals. Although MF receivers optimally compensate for white noise, they do not exploit the structure of multi-user interference. See R. Lupas and S. Verdu, "Linear Multiuser Detectors for Synchronous Code-Division Multiple-Access Channels," *IEEE Trans. on Info. Theory*, vol. 35, pp. 123-136, January 1989; and D. N. C. Tse and S. V. Hanly, "Linear Multiuser Receivers: Effective Interference, Effective Bandwidth and User Capacity," *IEEE Trans. on Info. Theory*, vol. 45, pp. 641-657, March 1999. Decorrelator receivers, conversely, optimally reject the multi-user interference but do not account for the white noise. There is a need, therefore, for a receiver that mitigates both the effect of multi-user interference and white noise, while requiring knowledge of only the signature signals. Such a receiver will often achieve acceptable performance irrespective of the white noise distribution, the channel gains, and the channel signal-to-noise-ratio.

SUMMARY OF THE INVENTION

In one aspect, the present invention provides a receiver comprising a bank of correlators for receiving signals comprising a linear combination of modulated signature signals and a noise component, and a correlation shaper operating on a vector output from the bank of correlators. The bank of correlators may be, for example, a decorrelator receiver or a matched filter receiver. In another embodiment, the receiver of the invention may be configured optionally with a bank of detectors for operating on the vector output of the correlation shaper.

The correlation shaper may be a linear transformation that is determined by minimizing the MSE between the vector output from the bank of correlators and the vector output from the correlation shaper.

The correlation shaper may be a whitening transformation or a subspace whitening transformation. Either embodiment may additionally be subject to the condition of minimizing the MSE between the vector output from the bank of correlators and the vector output from the correlation shaper.

The correlation shaper may also be chosen so that the covariance matrix of its vector output has the property that the second and subsequent rows are permutations of the first row. This embodiment may additionally be subject to the condition of minimizing the MSE between the vector output from the bank of correlators and the vector output from the correlation shaper.

The correlation shaper may alternatively be chosen so that the covariance matrix of the representation of the output vector of the correlation shaper in the space in which it lies has the property that the second and subsequent rows are permutations of the first row. This selection may also be subject to the MMSE constraint.

The bank of correlators cross-correlate the received signal with a set of correlating signals. In the embodiment in which the bank of correlators is a matched filter receiver, the set of cross-correlating signals are identical to the signature signals. In the embodiment in which the bank of correlators is a decorrelator receiver, the set of correlating signals are a function of the signature signals referred to below as the decorrelator signals. In different embodiments, the signals comprising the set of correlating signals may be orthogonal, geometrically uniform, projected orthogonal, or projected geometrically uniform. In each embodiment, the selection of the set of correlating signals may be subject to the additional constraint of minimizing the least-squares error ("LSE") between the set of correlating signals and the set of signature signals, or between the set of correlating signals and a set of decorrelator signals.

In another aspect, the present invention provides a method of processing signals in a multi-signature system comprising the steps of receiving a signal that is a linear combination of a set of modulated signature signals that has undergone some distortion, processing the received signal to obtain a first vector output, and shaping the correlation of the first vector output. The correlation shaping of the first vector output may be accomplished by performing a transformation, such as a whitening or subspace whitening transformation, and may further comprise the step of minimizing the MSE between the first vector output and the output vector from the correlation shaper.

In another embodiment, the correlation shaping of the first output vector is comprised of performing a transformation such that the covariance matrix of the output vector of the correlation shaping transformation has the property that the second and each subsequent row is a permutation of the first. The step of performing the transformation may further comprise the step of minimizing the MSE between the first vector output and the output vector from the transformation.

In another embodiment, the correlation shaping step may be comprised of performing a transformation such that the covariance matrix of the representation of the transformation output vector on the space in which it lies has the property that the second and each subsequent row is a permutation of the first. This approach may also be subject to the additional constraint of minimizing the MSE between the first vector output and the transformation output vector.

In another embodiment, the present invention provides a method of processing signals in a multi-signature system comprising the steps of receiving a signal that is a linear combination of a set of modulated signature signals that has undergone some distortion, and shaping the correlation of a vector output of a bank of correlators by cross-correlating the received signal with a set of orthogonal or geometrically uniform signals, and minimizing the LSE between the signature signals and the set of orthogonal or geometrically uniform signals, or between the decorrelator signals and the set of orthogonal or geometrically uniform signals.

The correlation shaping step may also be comprised of shaping the correlation of the vector output on a subspace by cross-correlating the received signal with a set of projected orthogonal or projected geometrically uniform signals, and minimizing the LSE between the projected orthogonal or projected geometrically uniform signals and the signature signals, or between the projected orthogonal or projected geometrically uniform signals and the decorrelator signals.

DETAILED DESCRIPTION

Preferred embodiments of the invention will now be described with reference to the accompanying figure of the drawing.

In one aspect, the present invention is a method for processing signals in a multi-signature system comprising the steps of receiving a signal that is a linear combination of a set of modulated signature signals that has undergone some distortion, and processing the received signal to obtain a vector output whose correlation may be shaped.

Figure 1:
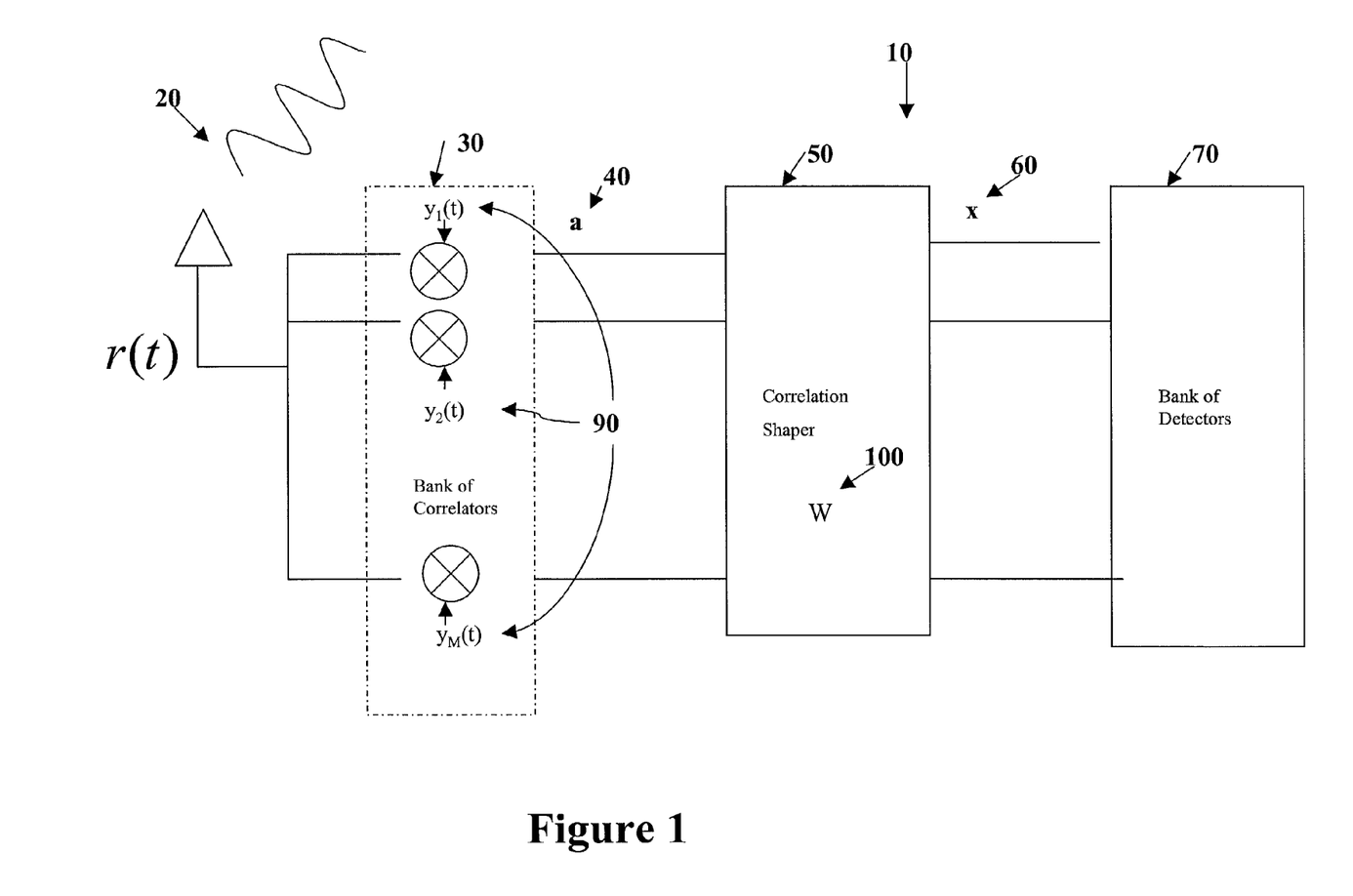
FIG. 1 is a schematic diagram illustrating a first embodiment of a receiver in accordance with the present invention.
Figure 2:
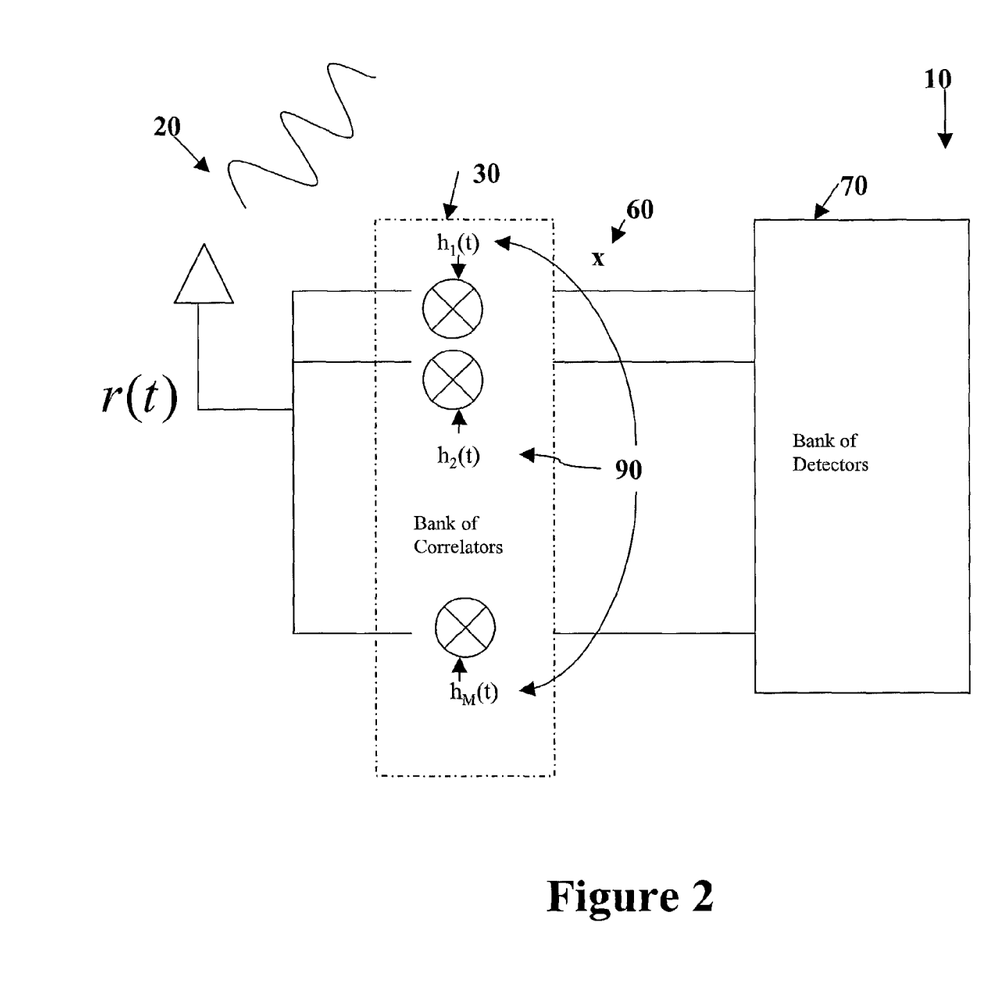
FIG. 2 is a schematic diagram illustrating a second embodiment of a receiver in accordance with the present invention.

Illustrated in FIG. 1, is a receiver in accordance with the present invention comprising a bank of correlators for receiving signals, and a correlation shaper operating on an output from the bank of correlators. The bank of correlators may comprise a matched filter receiver or a decorrelator receiver. Referring to FIG. 2, in another embodiment, the bank of correlators may provide the correlation shaping by cross-correlating with an appropriate set of correlating signals, and a separate correlation shaper element becomes non-essential.

Each user (or target) in a system contemplated by the present invention is associated with one of a set of signature signals $\{S_k(t), 1 \leq k \leq M\}$, which distinguishes that particular user's signal from all other signals propagating within the system. In this system, it is important for a receiver receiving a plurality of signature signals to be able to detect a coefficient that accounts for the user's signal strength (i.e., that multiplies each user signature signal) and or detect the presence or absence of various of the signature signals. To assist in signal detection, the receiver must process the received signal and distinguish an individual signature signal from among the linear combination of distorted signature signals it received.

The receiver and method of signal processing of the present invention allows an engineer to design a specific correlation shape for the vector output of the bank of correlators. In this way, the present invention overcomes the problems encountered with prior art matched filter and decorrelator processing methods by simultaneously compensating for white noise and exploiting the structure of multi-signature interference. The present invention is also useful in signal detection applications where the noise environment is not Gaussian.

In several of the embodiments provided herein, a design engineer could choose to have the vector output of the bank of correlators be completely decorrelated. In alternative embodiments, an engineer practicing the present invention could choose any appropriate correlation shape for the vector output of the bank of correlators. By shaping the correlation of the vector output of the bank of correlators, a design engineer can design a simple receiver tailored to receive the distorted multi-signature signal.

I. Problem Formulation

Referring to FIG. 1, a receiver 10 is configured to receive signal r(t) 20, which is a linear combination of a set of signature signals $\{S_k(t), 1 \leq k \leq M\}$ and a noise component n(t). The received signal r(t) 20 is processed by a bank of correlators 30, which may, for example, be a matched filter or a decorrelator receiver. The received signal r(t) 20 is cross-correlated with M signals $y_m(t)$ 90 so that the vector output has components $a_m = <y_m(t), r(t)>$ (inner product), where the signals $y_m(t)$ 90 are to be determined. The vector output a 40 may then be additionally shaped by a correlation shaper 50. The vector output x 60 of the correlation shaper could be passed to a detector 70 or similar device.

Described below are numerous embodiments of the present invention. Several of the embodiments presume that the bank of correlators 30 comprises a decorrelator receiver, and others presume the bank of correlators 30 comprises a matched filter receiver. One skilled in the art, however, will recognize that the bank of correlators 30 is not limited to being either a decorrelator receiver or a matched filter receiver. While these embodiments are physically distinct, many of their solutions are mathematically equivalent. For a discussion of this mathematical equivalence, see the co-pending patent application entitled "Correlation Shaping Matched Filter Receiver" filed Feb. 20, 2001, and assigned to the assignee of the present application, and Y. C. Eldar, A. V. Oppenheim, and D. Egnor, "Orthogonal and Projected Orthogonal Matched Filter Detection," submitted to *IEEE Trans. on Signal Proc.* January 2001. Both of these works are hereby incorporated by reference in their entirety. In the notation that follows, the symbol W is used with reference to a transformation function.

Consider an M user white Gaussian synchronous CDMA system. The received signal r(t) 20 is given by $$r(t) = \sum_{m=1}^{M} A_m b_m s_m(t) + n(t),$$

where $S_m(t)$ is the signature signal of the $m^{th}$ user, $A_m>0$ is the received amplitude of the $m^{th}$ user's signal, $b_m$ is a symbol transmitted by the $m^{th}$ user, and $n(t)$ is a white noise signal with zero mean and covariance $\sigma^2$.

Based on the received signal r(t) 20, a receiver may be designed to demodulate the information transmitted by each user. We restrict our attention to linear receivers that do not require knowledge of the received amplitudes or the noise level. The simplest of such receivers is the single user MF receiver, which correlates the received signal with each of the signature signals from the set of signature signals.

A linear multiuser detector that exploits the multi-user interference without knowledge of the channel parameters is the decorrelator receiver. The decorrelator receiver correlates the received signal with each of the decorrelator signals $v_m(t)$ corresponding to the matrix $$V = S(S^*S)^{-1},$$

where S is the matrix corresponding to the signature signals $S_m(t)$. So $a_m = <v_m(t), r(t)>$ an inner product which we wish to maximize for $1 \leq m \leq M$. For a mathematical discussion of the inner product, again see the Applicants' co-pending application "Correlation Shaping Matched Filter", U.S. application Ser. No. 09/788,890, filed Feb. 20, 2001.

It is known that a decorrelator receiver does not generally lead to optimal decisions, since in general the noise components in the outputs $a_m$ of the decorrelator receiver are correlated. This correlation is due to the fact that the outputs $a_m$ share information regarding the noise. Intuitively, it seems that eliminating this common (linear) information can improve the performance of the detector.

Let a 40 denote the vector output of the decorrelator receiver. Then, $$a = V^*r = Ab + V^*n,\qquad \text{Equation 1}$$

where $A = \text{diag}(A_1, \ldots, A_M)$. The covariance of the noise component $V^*n$ in a 40, denoted $C_a$, is $$C_a = \sigma^2 V^*V = \sigma^2 (S^*S)^{-1}.\qquad \text{Equation 2}$$

Note that $C_a$ is the covariance of a-a' where a'=E(a|b). Based upon the mathematics found in the Applicants' previously cited "Orthogonal Matched Filter Detection" reference, it follows that the noise components in a are uncorrelated if and only if the signature signals $S_m(t)$ are orthonormal. In this case, the decorrelator receiver does in fact lead to optimal decisions. To improve the detection performance when the signature signals are not orthonormal, without estimating the variance of the noise or the received amplitudes of the user's signals, one aspect of the invention whitens the output of the decorrelator receiver prior to detection, as depicted in FIG. 2. It will be shown that this approach does in fact lead to improved performance over the MF detector and a conventional decorrelator receiver in many cases.

Suppose we whiten the vector output a 40 of the decorrelator receiver using a whitening transformation (WT 50) W, to obtain the random output vector x=Wa, where the covariance matrix of the noise component in x 60 is given by $C_x = \sigma^2 I$, and then base our detection on x 60. We choose a WT W that minimizes the MSE given by $$E_{mse} = \sum_{m=1}^{M} E((x'_m - a'_m)^2),\qquad \text{Equation 3}$$

where $a'_m = a_m - E(a_m|b)$ and $x'_m = x_m - E(x_m|b)$.

Equivalent Problems

In this section, Equation 3 is formulated in two equivalent ways that provide further insight into the problem. Specifically, we demonstrate that the following problems are the same:

Problem 1: Find an optimal WT 50 W that minimizes the MSE defined above between the whitened output vector x=Wa and the input vector a, where a 40 is the vector output of the decorrelator receiver.

Problem 2: Find a set of orthonormal signals $\{h_m(t), 1 \leq m \leq M\}$ that are closest in a least squares sense to the signals $\{v_m(t), 1 \leq m \leq M\}$, namely that minimize $\Sigma_m <(v_m(t)-h_m(t)), (v_m(t)-h_m(t))>$. Then correlate the received signal with each of the signals $h_m(t)$ to obtain the whitened output vector x 60.

Problem 3: Find a set of orthonormal signals that are closest in a least squares sense to the signature signals $\{s_m(t), 1 \leq m \leq M\}$. Then correlate the received signal with these signals to obtain whitened vector output x 60.

The remainder of this section discusses the equivalence between the problems above and their solution.

We first show that the detector depicted in FIG. 1 is equivalent to the detector of FIG. 2, where the signals $h_m(t)$ are orthonormal and given by $h_m(t) = \Sigma_k W^*_{km} v_k(t)$, where $W^*_{km}$ denotes the $km^{th}$ element of W*.

The vector output x 60 of the WT in FIG. 1 is given by $$x = Wa = WV^*r = H^*r,\qquad \text{Equation 4}$$

where H=VW*. Therefore, x 60 can be viewed as the output of a bank of correlators 30 with signals $h_m(t) = \Sigma_k W^*_{km} v_k(t)$, as depicted in FIG. 2. Furthermore, employing Equation 2 leads to $H^*H = WV^*VW^* = 1/\sigma^2 W C_a W^* = 1/\sigma^2 C_x = I$, so that the signals $h_m(t)$ are orthonormal.

We will now demonstrate that the minimization of $E_{mse}$ given by Equation 3 is equivalent to the minimization of the LSE $E_{ls}(v_m(t), h_m(t))$, where $$E_{ls}(v_m(t), h_m(t)) = \Sigma_m <(v_m(t)-h_m(t)), (v_m(t)-h_m(t))>.\qquad \text{Equation 5}$$

Using Eqs. 4 and 1 results in $$x - a = (H-V)^*r = (H-V)^*(Sab+n),$$

and $$x'_m - a'_m = <(h_m(t) - v_m(t)), n(t)>.\qquad \text{Equation 6}$$

Substituting Equation 6 into Equation 3 yields $$E_{mse} = \sigma^2 \sum_{m=1}^{M} <(h_m(t) - v_m(t)), (h_m(t) - v_m(t))>.\qquad \text{Equation 7}$$

Comparing Equation 7 and Equation 5 leads to the conclusion that the optimal whitening problem is equivalent to the problem of finding a set of orthonormal signals $h_m(t)$ that are closest in a least squares sense to the signals $v_m(t)$, establishing the equivalence of Problems 1 and 2.

Finally, Problems 2 and 3 may be shown to be equivalent by proving that the orthonormal signals $h_m(t)$ that minimize $E_{ls}$ ($v_m(t),h_m(t)$) and $E_{ls}(s_m(t),h_m(t))$ are equal. To this end, we rely on the following lemmas.

Lemma 1: Let $\{y_m(t), 1 \leq m \leq M\}$ be a set of orthogonal signals with $<y_k(t),y_m(t)>=c^2_m \delta_{km}$, where $c_m>0$ is arbitrary, and $\delta_{km}=1$ when k=m and 0 otherwise. Then the orthonormal signals $h_m(t)$ that minimize $E_{ls}(y_m(t),h_m(t))$ are $h_m(t)=y_m(t)/|c_m|$.

Proof: Since $<h_m(t),h_m(t)>=1$, minimization of $E_{ls}(y_m(t),h_m(t))$ is equivalent to maximization of $$\sum_{m=1}^{M} \langle h_m(t) y_m(t) \rangle.$$

Using the Cauchy-Schwartz inequality, $$\sum_{m=1}^{M} \langle h_m(t), y_m(t) \rangle \leq \sum_{m=1}^{M} |\langle h_m(t), y_m(t) \rangle| \leq \sum_{m=1}^{M} \langle y_m(t), y_m(t) \rangle^{1/2},$$

with equality if and only if $h_m(t)=y_m(t)/|cm|$.

The following corollary results from Lemma 1.

Corollary 1: Let $\{y'_m(t)=d_m y_m(t), 1 \leq m \leq M\}$, where $d_m>0$ are arbitrary constants and the signals $y_m(t)$ are orthogonal. Then the orthonormal signals $h_m(t)$ that minimize $E_{ls}(y_m(t),h_m(t))$ and $E_{ls}(y'_m(t),h_m(t))$ are the same.

Lemma 2: Let $y_m(t)$ and $y'_m(t)$ denote the columns of Y and Y'=YU respectively, where U is an arbitrary unitary matrix. Let the columns of H and H' be the orthonormal signals $h_m(t)$ and $h'_m(t)$ that minimize $E_{ls}(y_m(t),h_m(t))$ and $E_{ls}(y'_m(t)h_m(t))$ respectively.

Then H'=HU.

Proof: Since (H')*H'=U*H*HU=I, the signals $h'_m(t)$ are orthonormal. The lemma then follows from $$E_{ls}(y_m(t), h_m(t)) = Tr((Y-H))*(Y-H))$$
$$= Tr(U(Y-H)*(Y-H)U*) = E_{ls}(y'_m(t), h_m(t)).$$

Combining Corollary 1 and Lemma 2 it follows that if we find a unitary matrix such that the columns of Y'=VU and S'=SU are both orthogonal and proportional to each other, then the orthonormal signals minimizing $E_{ls}(v_m(t),h_m(t))$ and $E_{ls}(s_m(t),h_m(t))$ are the same. Let $S=Q\Sigma Z^*$ be the Singular Value Decomposition of S, where Q and Z are unitary matrices and $\Sigma$ is a diagonal N x M matrix with diagonal elements $\sigma_m>0$. Then $V=S(S^*S)^{-1}=Q\tilde{\Sigma}Z^*$, where $\tilde{\Sigma}$ is a diagonal N x M matrix with diagonal elements $1/\sigma_m$. Now, let V'=VZ and S'=SZ. Then the columns $v'_m(t)$ and $s'_m(t)$ of V' and S' respectively, are both orthogonal, and $v'_m(t)=d_m s'_m(t)$ where $d_m=1/\sigma_m^2$. Thus, the orthonormal signals minimizing $E_{ls}(v_m(t),h_m(t))$ and $E_{ls}(s_m(t),h_m,(t))$ are the same.

This completes the proof that the three Problems outlined above are equivalent. The optimal whitening problem has been solved in its most general form in the Applicants' "Orthogonal Matched Filter Detection" reference cited above, from which it follows that the WT minimizing Equation 3 is $$W = \sigma C_a^{-1/2} = (S^*S)^{1/2}.$$

The orthonormal signals that minimize $E_{ls}(v_m(t),h_m(t))$ and $E_{ls}(s_m(t),h_m(t))$ are then the columns of $$H = VW^* = V(S^*S)^{1/2} = S(S^*S)^{-1/2}.$$

Whitening and Subspace Whitening

In one instance, the MMSE between the vector output a 40 of a bank of correlators 30 comprising a matched filter receiver and the vector output x 60 of a correlation shaper 50 comprising a whitening transformation W is achieved by employing a whitening transformation given by $$W = (S^*S)^{-1/2}.$$

In another instance, the MMSE between the vector output a 40 of a bank of correlators 30 comprising a matched filter receiver and the vector output x 60 of a correlation shaper 50 comprising a subspace whitening transformation W is achieved by employing a subspace whitening transformation given by $$W = ((S^*S)^{1/2})^{\dagger}.$$

In a third instance, the MMSE between the vector output a 40 of a bank of correlators 30 comprising a decorrelator receiver and the vector output x 60 of a correlation shaper 50 comprising a whitening transformation W is achieved by employing a whitening transformation given by $$W = (S^*S)^{1/2}.$$

In a fourth instance, the MMSE between the vector output a 40 of a bank of correlators 30 comprising a decorrelator receiver and the vector output x 60 of a correlation shaper 50 comprising a whitening transformation W is achieved by employing a whitening transformation given by $$W = (S^*S)^{1/2}.$$

Covariance Matrix of the Correlation Shaper Output is Arbitrary

The correlation shaper 50 may be chosen so that the covariance matrix $C_x$ of the output vector is arbitrary within the mathematical constraints imposed upon any covariance matrix. In this case, correlation shaper 50 may be chosen so that $WC_aW=C_x$, where $C_a$ is the covariance matrix of the vector output a 40 of the bank of correlators 30. In this aspect, if the bank of correlators 30 comprises a matched filter receiver, then $C_a=(S^*S)$. Alternately, if the bank of correlators 30 comprises a decorreclator reciever, then $C_a=(S^*S)^{\dagger}$.

Restriction of Covariance Matrix Of Correlation Shaper Output to Permutation Property Correlation shaper 50 may be chosen so that the covariance matrix of output vector x 60 has the property that the second row and each subsequent row is a permutation of the first row. Correlation shaper 50 may also be chosen so that the covariance matrix of output vector x 60 when represented in subspace has the above property. The latter correlation shaper 50 may be referred to as a subspace correlation shaper.

A correlation shaper 50 that minimizes the MSE between the input and the output is given as follows. Let $\{d_k, 1 \leq k \leq M\}$ be the elements of the first row of the specified covariance matrix. Let D be a diagonal matrix whose diagonal elements are the square-roots of the generalized Fourier transform of the sequence $d_k$. The generalized Fourier transform is defined on a group formed by the elements of the prespecified covariance matrix. See Y. C. Eldar, G. D. Forney, Jr., "On Quantum Detection and the Square-Root Measurement", *IEEE Trans. on Inform. Theory*, vol. 47, No. 3, March 2001 (hereby incorporated by reference). Let F be a Fourier matrix representing the generalized Fourier transform over the group formed by the elements of the covariance matrix.

In a first embodiment, the MMSE between the vector output a 40 of a bank of correlators 30 comprising a matched filter receiver and the vector output x 60 of a correlation shaper 50 is achieved by employing a transformation given by $$W=SFD(DF^*S^*SFD)^{-1/2}DF^*.$$

In a second embodiment, the MMSE between the vector output a 40 of a bank of correlators 30 comprising a matched filter receiver and the vector output x 60 of a subspace correlation shaper 50 is achieved by employing a subspace transformation given by $$W=SFD((DF^*S^*SFD)^{1/2})^\dagger DF^*.$$

In a third embodiment, the MMSE between the vector output a 40 of a bank of correlators 30 comprising a decorrelator receiver and the vector output x 60 of a correlation shaper 50 is achieved by employing a transformation given by $$W=VFD(DF^*V^*VFD)^{-1/2}DF^*.$$

In a fourth embodiment, the MMSE between the vector output a 40 of a bank of correlators 30 comprising a decorrelator receiver and the vector output x 60 of a subspace correlation shaper 50 is achieved by employing a subspace whitening transformation given by $$W=VFD((DF^*V^*VFD)^{1/2})^\dagger DF^*.$$

Orthogonal & Projected Orthogonal, Geometrically Uniform & Projected Geometrically Uniform Correlating Signals In all cases, the closest signals in a least-squares sense to the signature signals are given by $$q_k(t) = \sum_{m=1}^{M} s_m(t) W_{mk}^*$$

where W is the corresponding MMSE correlation shaper transformation, and $W^*_{mk}$ is the $mk^{th}$ element of W. If the shaping signals are to be orthogonal signals, then a whitening transformation is to be used. If the shaping signals are to be projected orthogonal signals, then a subspace whitening transformation is to be employed. If the shaping signals are geometrically uniform signals, a transformation that results in a covariance matrix with the permutation property is to be used. And for projected geometrically uniform shaping signals, a subspace correlation shaper with the permutation property should be used.

Similarly, the closest signals in a least-squares sense to the decorrelator signals are given by $$q_k(t) = \sum_{m=1}^{M} v_m(t) W_{mk}^*$$

where W is the corresponding MMSE correlation shaper transformation.

II. Specific Embodiments

A. Orthogonal and Projected Orthogonal, Geometrically Uniform and Projected Geometrically Uniform Signals The following embodiments vary depending on the desired correlation shape and upon whether the received signals are linearly independent or linearly dependent. In each of the embodiments of this section, it may be desirable to minimize the MSE between vector output x 60 of correlation shaper 50 and vector output a 40 of the bank of correlators 30.

Linearly Independent Received Signals and a Decorrelated Output Vector

In the first of these embodiments, it is assumed that the correlation shape chosen is to have the output vector x 60 completely decorrelated, while the received signature signals are linearly independent. In this embodiment, the correlation shaper 50 performs a whitening transformation on the output vector a 40. After the whitening transformation W, the vector output x 60 of correlation shaper 50, which was correlated when it emerged from the bank of correlators 30, becomes uncorrelated. This embodiment may perform satisfactorily for a given system even if the correlation shaper does not result in the smallest MSE value between vector outputs x 60 and a 40.

Linearly Independent Received Signals and a Specified or Arbitrary Output Vector Correlation Shape In another embodiment, the vector output x 60 of correlation shaper 50 may have a specified correlation shape. The correlation shape of vector output x 60 may be altered by selecting the covariance matrix to have specific properties. In addition, one skilled in the art may decide in certain circumstances to allow the correlation shape of output vector x 60 to be arbitrary. In this instance, the covariance matrix may be comprised of arbitrary values that satisfy the constraints imposed on any covariance matrix.

The specified covariance matrix of the vector output x 60 may be selected to have the permutation property described above in which the second and each subsequent row is a permutation of the first.

This embodiment may perform satisfactorily for a given system even if selected correlation shaper 50 does not result in the smallest MSE value between vector outputs x 60 and a 40.

Linearly Dependent Received Signals and Decorrelated Output

In another embodiment, vector output x 60 may be decorrelated when the received signature signals are linearly dependent. When the received signals are linearly dependent, the components of vector output a 40 of the bank of correlators 30 are deterministically linearly dependent, and consequently the components of x=Wa are also linearly dependent and cannot all be statistically uncorrelated. Therefore, the linear dependence of the signature signals renders conventional whitening techniques impossible. Thus, in this alternative embodiment, vector output a 40 of the bank of correlators 30 will be whitened on the subspace in which it lies. Subspace whitening may be defined such that the whitened vector lies in the subspace as specified in the previously cited reference "Orthogonal and Projected Orthogonal MF Detection", and its representation in terms of any orthonormal basis for this is white subspace.

Linearly Dependent Received Signals & Output Has Specific Correlation Shape

In another embodiment where the signature signals are linearly dependent, the correlation shaping performed by the correlation shaper 50 may utilize the permutation property described above but applied to a shaping performed on a subspace spanned by the signature signals.

B. Selecting an Appropriate Set of Orthogonal Signals

Referring to FIG. 2, a second set of embodiments share the characteristic of achieving correlation shaping by selecting appropriate correlating signals $h_m(t)$ 90. The selection of this set of signals varies depending upon the desired correlation shape of output vector x 60 and upon whether the signature signals are linearly independent or linearly dependent. Alternative embodiments for each of these variations are discussed below. In each of the embodiments below, it may be desirable to minimize the LSE between the signature signals $s_m(t)$ and the correlating signals $h_m(t)$ 90, however those skilled in the art will recognize that adequate performance may be achieved although the LSE may not be at its minimum. It may also be desirable to minimize the LSE between the decorrelator signals $v_m(t)$ and the correlating signals $h_m(t)$.

Linearly Independent Received Signals and Orthogonal Signals

In one embodiment, if the received signature signals are linearly independent, the correlation shape of output vector x 60 could be decorrelated by choosing a set of orthogonal signals $h_m(t)$ 90.

Linearly Independent Received Signals and Geometrically Uniform Signals

In another embodiment, a particular desired correlation shape for vector output x 60 may be achieved by altering the selection of correlating signals $h_m(t)$ 90. By requiring $h_m(t)$ 90 to be geometrically uniform, the covariance matrix of the vector output x 60 of bank of correlators 30 has the property that the second and each subsequent row is a permutation of the first. See generally G. D. Forney, Jr., "Geometrically Uniform Codes," *IEEE Trans. Inform. Theory*, vol. IT-37, No. 5, pp. 1241-60, September 1991, and Y. C. Eldar, "Least-Squares Inner Product Shaping", submitted to *Linear Algebra and its Applications*, January 2001, the contents of which are hereby incorporated by reference.

Linearly Dependent Received Signals and Projected Orthogonal Signals

If it is desired that the correlation shape of the output vector x 60 of the bank of correlators 30 be decorrelated on the space in which it lies, the set of signals $h_m(t)$ 90 should be chosen as a projected orthogonal signal set. The projected orthogonal signals are a projection of a set of orthonormal signals onto the space spanned by the signature signals, $\{s_1(t), s_2(t) \ldots s_M(t)\}$.

Linearly Dependent Received Signals and Projected Geometrically Uniform Signals

If the covariance matrix of vector output x 60, when represented in terms of an orthonormal basis for the space in which it lies, has the property that subsequent rows are permutations of the first, then $h_m(t)$ 90 should be selected to be a set of projected geometrically uniform set of signals, i.e., a set of geometrically uniform signals projected onto the space spanned by the signature signals. In an alternative embodiment, $h_m(t)$ 90 could be selected to be the closest projected geometrically uniform signals in a LSE sense to the signature signals $\{s_1(t), s_2(t) \ldots S_M(t)\}$.

The receiver and method of signal processing of the present invention are highly versatile and can be utilized irrespective of whether the plurality of signature signals are linearly dependent or linearly independent. The invention disclosed herein can be implemented for both continuous-time signals and discrete signals. Embodiments disclosed herein may also be implemented in hardware, for example in DSP microprocessors, or in software using the C++ programming language, for example. In addition to comprising a receiver 10 for performing multi-signature signal processing, each of the preceding embodiments may additionally be configured with a detector 70 to provide signal detection following the correlation shaping.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A receiver comprising:
   a bank of correlators for receiving a received signal that is a linear combination of a set of non-orthonormal signature signals that has undergone some distortion; and
   a set of correlating signals; wherein
   the bank of correlators cross-correlates the received signal with the set of correlating signals to produce a vector output, and
   the set of correlating signals is orthogonal and is determined by minimizing the least-squares error between the set of correlating signals and the set of signature signals.

2. The receiver of claim 1, wherein the set of correlating signals is a set of projected orthogonal signals.

3. A receiver comprising:
   a bank of correlators for receiving a received signal that is a linear combination of a set of non-orthonormal signature signals that has undergone some distortion; and
   a set of correlating signals; wherein
   the bank of correlators cross-correlates the received signal with the set of correlating signals to produce a vector output, and
   the set of correlating signals is orthogonal and is determined by minimizing the least-squares error between the set of correlating signals and a set of decorrelator signals $v_m(t)$ corresponding to $V=S(S*S)^{-1}$ where S is the matrix corresponding to the signature signals.

4. A receiver comprising:
   a bank of correlators for receiving a received signal that is a linear combination of a set of signature signals that has undergone some distortion; and
   a set of correlating signals; wherein
   the bank of correlators cross-correlates the received signal with the set of correlating signals to produce a vector output, and
   the set of correlating signals is a set of geometrically uniform signals and is determined by minimizing the least-squares error between the set of correlating signals and the set of signature signals.

5. The receiver of claim 4, wherein the set of correlating signals is a set of projected geometrically uniform signals.

6. A method for processing signals in a multi-signature system comprising the steps of:
   receiving a signal that is a linear combination of a set of non-orthonormal signature signals that has undergone some distortion;
   cross-correlating the received signals with a set of correlating signals; and
   determining the set of correlating signals by requiring the correlating signals to be orthogonal and minimizing a least-squares-error between the signature signals and the set of correlating signals.

7. The method of claim 6, wherein the set of correlating signals is a set of projected orthogonal signals.

8. A method for processing signals in a multi-signature system comprising the steps of:

receiving a signal that is a linear combination of a set of signature signals that has undergone some distortion;

cross-correlating the received signals with a set of correlating signals; and determining the set of correlating signals by requiring the correlating signals to be geometrically uniform and minimizing a least-squares-error between the signature signals and the set of correlating signals.

9. The method of claim 8, wherein the set of signals is a set of projected geometrically uniform signals.

10. A method for processing signals in a multi-signature system comprising the steps of:

receiving a signal that is a linear combination of a set of signature signals that has undergone some distortion;

cross-correlating the received signals with a set of correlating signals; and determining the set of correlating signals by requiring the correlating signals to be orthogonal and minimizing a least-squares-error between the set of correlating signals and a set of decorrelator signals $v_m(t)$ corresponding to $V=S(S*S)_{-1}$ where S is the matrix corresponding to the signature signals.

* * * * *

UNITED STATES PATENT AND TRADEMARK OFFICE
CERTIFICATE OF CORRECTION

PATENT NO. : 7,636,403 B2 Page 1 of 1
APPLICATION NO. : 09/888762
DATED : December 22, 2009
INVENTOR(S) : Eldar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 685 days.

Signed and Sealed this

Ninth Day of November, 2010

David J. Kappos
*Director of the United States Patent and Trademark Office*